United States Patent [19]

Dahlquist

[11] E Re. 28,586

[45] Reissued Oct. 28, 1975

[54] GRATE

[75] Inventor: Emil F. Dahlquist, Clinton, Conn.

[73] Assignee: Radiant Grate, Inc., Clinton, Conn.

[22] Filed: June 17, 1974

[21] Appl. No.: 479,873

Related U.S. Patent Documents

Reissue of:

[64] Patent No.: 3,771,511
Issued: Nov. 13, 1973
Appl. No.: 241,314
Filed: Apr. 5, 1972

[52] U.S. Cl. ..... 126/137; 126/165; 126/298; 126/336

[51] Int. Cl.[2] ..... F23H 13/02; F24B 1/26

[58] Field of Search ..... 126/126, 137, 164, 165, 126/298, 336

[56] References Cited

UNITED STATES PATENTS

| | | | |
|---|---|---|---|
| 746,539 | 12/1903 | Low | 126/165 |
| 890,669 | 6/1908 | Low | 126/298 |
| 1,125,581 | 1/1915 | McGee | 126/137 X |
| 1,943,209 | 1/1934 | Davis | 126/165 X |
| 2,414,033 | 1/1947 | Flaacke | 126/164 |
| 2,985,165 | 5/1961 | Peterson et al. | 126/165 |

*Primary Examiner*—Carroll B. Dority, Jr.
*Assistant Examiner*—Peter D. Ferguson

[57] ABSTRACT

A fireplace grate includes a log supporting portion disposed at an angle to the horizontal such that self-feeding of logs is effected while providing a source of radiant heat from the underside of the logs. Also provided are support means below the log supporting portion for a food carrying member.

6 Claims, 4 Drawing Figures

GRATE

Matter enclosed in heavy brackets [ ] appears in the original patent but forms no part of this reissue specification; matter printed in italics indicates the additions made by reissue.

---

This invention relates to grates and more particularly relates to grates adapted to be used in a fireplace.

The present invention provides a grate adapted to support logs for burning in a particular arrangement so that as the lowermost logs therein are consumed the uppermost logs will roll or slide down to a point where the burning temperature is higher.

Additionally, a grate embodying the present invention is so arranged and the support for the logs is at such an angle that as the logs are consumed there will be a large amount of heat radiated into a room.

The invention provides a grate in which one log-supporting portion is angled to the horizontal to such an extent that as the logs supported thereon are consumed, the underside of the logs will be exposed and will provide a source of radiant heat. Additionally, as coals fall from the log, a bed of embers will be established below the grate which will further define together with the burning logs a source of radiant energy, and will also provide heat emanating from two different planes which allows food to be quickly cooked on both sides at once.

An object of this invention is to provide a new and improved fireplace grate.

Another object of this invention is to provide a fireplace grate having a new and improved construction which will increase the direct radiation of heat from the burning logs without the usual time delay required in heating the firebrick defining a fireplace.

A further object of this invention is to provide a grate having new and improved structural means permitting rapid cooking of food thereon.

The features of the invention which are believed to be novel are particularly pointed out and distinctly claimed in the concluding portion of this specification. The invention, however, both as to its operation and organization, together with further objects and advantages thereof, may best be appreciated by reference to the following detailed description taken in conjunction with the drawings, wherein:

Figure 1:
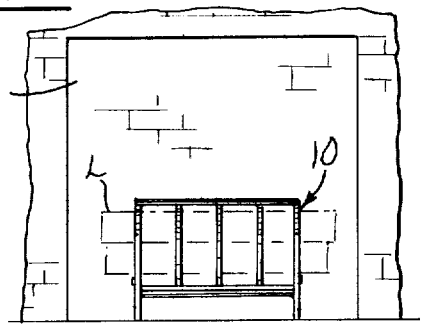
FIG. 1 is a front elevation of a fireplace with a grate therein.

A grate 10 embodying the invention is shown in a fireplace opening 11 with logs L therein. The grate as disclosed comprises a plurality of rods or bars 12 which are formed as more clearly shown in FIG. 3 with a portion 13 at an angle A to the horizontal adapted to support logs L thereon, a portion 14 extending at essentially right angles to portions 13 and providing stops for the logs L as they roll or slide down portion 13. Portion 13 has an extension 15 providing a retaining lip or ledge for the last log in a bundle. Ends of portions 15 are joined to a cross-member 16 preferably by welding.

The ends of portions 14 are similarly joined to a cross-member 17.

Front legs 18 extend downwardly from portions 13 and rear legs 19 may be bent extensions of a lower cross-member 20. Legs 19 are substantially shorter than legs 18.

The legs 18 are chosen in length in relation to legs 19 so as to provide an angle A of at least 25°. Additionally, the legs 19 are chosen in length so that the juncture of the portions 13 and 14 will be about 4 inches above the supporting member upon which the grate stands.

With this arrangement as the logs are comsumed, and as the ember bed B is built up, there will be a substantial radiation of heat as indicated by the arrows H from the burning underside of the logs L and from the bed B. This construction further provides substantial clearance for convection and circulation of air beneath the logs and therebetween as indicated by the arrows C to enhance combustion.

In practice, it has been found that the lowermost logs in the grate indicated as L1 and L2 will burn at a very high temperature and will be rapidly consumed while the outer logs L3 and L4 adjacent their upper surfaces will be relatively cool. As the lower logs L1 are consumed, the high angle of disposition of the portions 13 will cause the remaining logs to slide downwardly towards the position of L1.

The substantially upright retaining portion also provides a spacing between the burning logs and the back wall of the fireplace provides an air passage therebetween, and prevents overheating of the back wall.

The grate construction as thus far described provides a log-supporting grate with a log-supporting portion disposed at an angle of at least about 25° from the horizontal and a log stopping portion at substantially right angles thereto. The front and rear supporting legs are chosen in length to provide at least about a 25° angle and further to hold the grate a sufficient distance above the supporting base so that there is a definite and decided spacing between the underside of the supported logs and the base or the ember bed that builds up on the base. Moreover, the space and hence the area defined between the log support portions 13 is large as compared to the area of the underside of portions 13, so that the area of the burning logs is maximized for radiation purposes. For purposes of example only, the portions 13 may be formed from five-eighths inch bar stock with spacings of three and one-half inches therebetween, and the length of portions 13 (excluding lip 16) made to be fourteen inches.

The invention further provides means for permitting the cooking of foods thereon. A support member, generally shown as an angle 22, extends across the members 12 and is supported on member 20 and legs 19. Support members 23, which may generally be in the shape of a half washer, are welded to the front legs 18 and are adapted to support a rod 24 extending therebetween.

Figure 3:
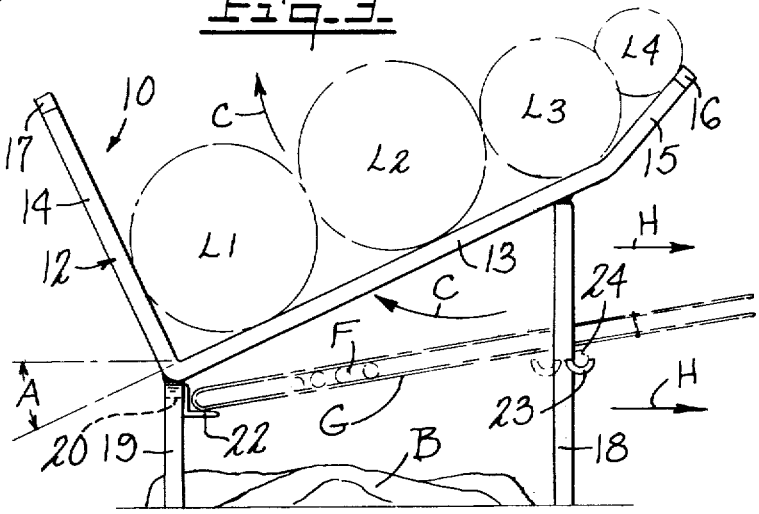
FIG. 3 is an end elevation of the grate of FIG. 2.

As exemplified in FIG. 3. a grill G adapted to carry food F between opposite sides thereof may be supported on members 22 and 24 and exposed to cooking heat from both the ember bed B and the underside of the logs.

In a grate of the size shown, the legs 18 are 9 inches high with the rod 24 supported at a height of about four and one-half inches from the floor. The lower surface of angle 22 would be about three inches from the floor.

These dimensions are illustrative only to show that the grill G is supported equi-distant between the underside of the logs and the ember bed.

Figure 4:
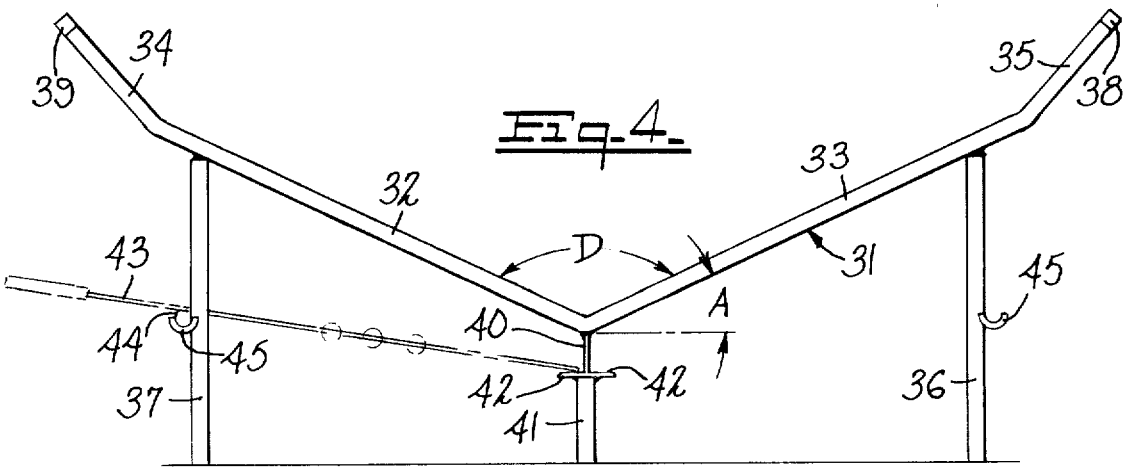
FIG. 4 is an end elevation of another grate embodying the invention.

Another embodiment of the invention is shown in FIG. 4 adapted to be used in conjunction with double-opening fireplaces, that is, fireplaces disposed in a wall with openings on either side. This grate 30 comprises a plurality of spaced apart members 31 having portions 32 and 33 defining a shallow V shape with the arms thereof disposed at an angle A which is at least 25° to the horizontal. The arms 32 and 33 extend into ledge or lip portions 34 and 35 for the same purposes as the ledge or lip portions 15. Outer legs 36 and 37 support the extreme members 31. Cross-members 38 and 39 extend across the extremities of members 31 while another cross-member, which is shown in generally an inverted T section 40, extends along the members 31 at the junction of the arms 32 and 33. Member 40 may be supported on legs 41. The purpose of member 40 is to provide the ledges 42 to support one end of a food-carrying member, such as a skewer 43, which is also supported by a rod 44 which extends across support members 45 on each set of outer legs.

Figure 2:
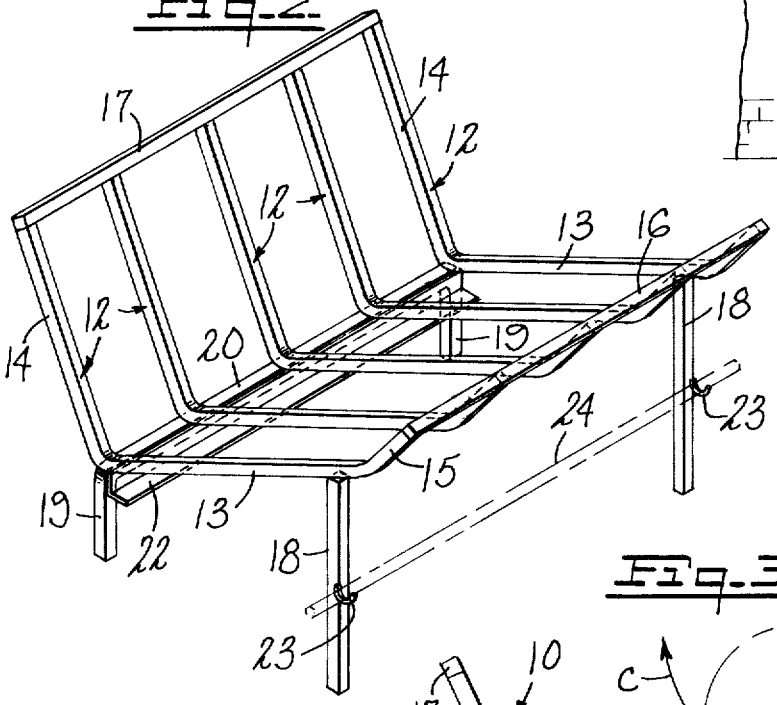
FIG. 2 is a view in perspective of a grate embodying the invention.

The grate described in FIG. 4 has the operative effect as the grate described in conjunction with FIGS. 1—3 but may be utilized on either side of a double-opening fireplace.

Preferably, the arms 32 and 33 will not be disposed at an angle A greater than 45° from the horizontal. Otherwise, there will be a tendency for the bottom logs to bind between the arms if the angle D therebetween decreases below ninety degrees.

A grate embodying the invention provides a construction which permits development of a radiant heat source in a fireplace which will radiate heat without waiting for the fire brick of the fireplace to become heated. Moreover, the grate construction permits fresh logs to roll or slide to the area of consumption as logs are consumed.

While the log supporting and retaining portions and lip portion have been shown formed from continuous bar stock, it will be appreciated that they may be fabricated separately and joined as by welding. Obviously, other structural and fabricating modifications may be made in the construction of a grate embodying the invention.

It may thus be seen that the objects of the invention set forth as well as those made apparent from the preceding description are efficiently attained. While preferred embodiments of the invention have been set forth for purposes of disclosure further embodiments of the invention as well as modifications to the disclosed embodiments which do not depart from the spirit and scope of the invention may occur to others skilled in the art. Accordingly, the appended claims are intended to cover all embodiments and modifications of the invention which do not depart from the spirit and scope of the invention.

What is claimed is:

1. A grate comprising a log-supporting portion and a log-retaining portion, said log-supporting portion comprising a pair of end members and a plurality of spaced apart intermediate members all disposed at an angle of at least about 25° to the horizontal, said retaining portion extending generally vertically from said supporting members, the total area of spacing between said supporting members being substantially greater than the area of said supporting members so as to permit heat due to burning of logs in said grate to radiate outwardly from the front of said grate, a pair of front legs and a pair of rear legs supporting said grate, first support means extending between said front legs below said supporting members, second support means extending between said rear legs below said supporting member, said first and second support means providing spaced apart supports for a food carrying member therebetween below said supporting surfaces.

2. The grate of claim 1 wherein said pair of rear legs spaces the apex of the angle defined by said supporting portion and said retaining portion at least about 4 inches from the surface for supporting said grate.

3. The grate of claim 1 wherein the forward ends of said log supporting members are disposed to the horizontal at an angle of greater than 25° to provide a retaining ledge extending upwardly and outwardly of said log supporting members.

*4. A grate for use in a fireplace having a back wall and a base, said grate comprising a log-supporting portion and a log-retaining portion, said log-supporting portion comprising a plurality of essentially parallel spaced apart supporting members all disposed at an angle of substantially 25° to the horizontal, said retaining portion extending upwardly and backwardly from a juncture with said supporting portion at an angle therewith of essentially 90°, said supporting members being of sufficient number to support logs intermediate the ends thereof but spaced apart a sufficient distance to allow embers from logs in said grate to fall through said supporting portion to the base, support means comprising front legs and rear legs supporting said grate, whereby the upper end of said log-retaining portion extends backwardly of said log-supporting portion from said juncture and acts to space said grate outwardly from a fireplace back wall and permit air to circulate behind said grate, said legs supporting said grate above the base a sufficient distance to permit build-up of an ember bed on the base while leaving a defined space between the underside of said log-supporting portion and the formed ember bed.*

*5. The grate of claim 4 where said members comprising said log-supporting portion are angled upwardly at an angle greater than the angle of said support portion outwardly beyond said front legs.*

*6. The grate of claim 4 wherein said rear legs support said grate at a juncture of said support ng protion and said retaining portion at least four inches above the base.*

* * * * *

UNITED STATES PATENT AND TRADEMARK OFFICE

CERTIFICATE OF CORRECTION

PATENT NO. : Reissue 28586

DATED : October 28, 1975

INVENTOR(S) : Emil F. Dahlquist

It is certified that error appears in the above-identified patent and that said Letters Patent are hereby corrected as shown below:

Claim 6, line 2, "support ng protion" should read --supporting portion--.

Signed and Sealed this

*eleventh* Day of *May 1976*

[SEAL]

*Attest:*

RUTH C. MASON
*Attesting Officer*

C. MARSHALL DANN
*Commissioner of Patents and Trademarks*